United States Patent [19]
Terasawa et al.

[11] Patent Number: 5,913,005
[45] Date of Patent: Jun. 15, 1999

[54] SINGLE-MODE OPTICAL FIBER

[75] Inventors: Yoshiaki Terasawa; Takatoshi Kato; Fumiyoshi Ohkubo; Yosuke Yamazaki, all of Yokohama, Japan

[73] Assignee: Sumitomo Electric Industries, Ltd., Osaka, Japan

[21] Appl. No.: 09/015,505

[22] Filed: Jan. 29, 1998

[30] Foreign Application Priority Data

Jan. 29, 1997 [JP] Japan ................................ 9-015507
Dec. 8, 1997 [JP] Japan ................................ 9-337159

[51] Int. Cl.$^6$ ............................................ G02B 6/18
[52] U.S. Cl. ......................... 385/127; 385/126; 385/124
[58] Field of Search ................................ 385/124–127

[56] References Cited

U.S. PATENT DOCUMENTS

| | | | |
|---|---|---|---|
| 4,852,968 | 8/1989 | Reed | 385/127 |
| 5,555,340 | 9/1996 | Onishi et al. | 385/127 |
| 5,721,800 | 2/1998 | Kato et al. | 385/127 |
| 5,740,297 | 4/1998 | Onishi et al. | 385/127 |
| 5,802,235 | 9/1998 | Akasaka | 385/123 |
| 5,822,488 | 10/1998 | Terasawa et al. | 385/127 |
| 5,838,867 | 11/1998 | Onishi et al. | 385/123 |

FOREIGN PATENT DOCUMENTS

| | | |
|---|---|---|
| 0 721 119 A1 | 7/1996 | European Pat. Off. . |
| 3-18161 | 3/1991 | Japan . |

OTHER PUBLICATIONS

A.O. Bjarklev, "Inflation Between Macrobending Losses and Cutoff Wavelength in Dispersion–Shifted Segmented–Core Fibres", Electronics Letters, dated May 22, 1986, vol. 22, No. 11, pp. 574–575.

Patent Abstracts of Japan, vol. 013, No. 159 (P–858), Dec. 27, 1988. re JP–63 318505 A.

*Primary Examiner*—John D. Lee
*Assistant Examiner*—Juliana K. Kang
*Attorney, Agent, or Firm*—Pillsbury Madison & Sutro LLP

[57] ABSTRACT

The present invention relates to an S-mode optical fiber having a structure which can effectively restrain dispersion slope from increasing. In this S-mode optical fiber, an optical core is constituted by inner and outer cores, while an optical cladding is constituted by an inner cladding in which "tailing" occurs and an outer cladding. In a cross section of the S-mode optical fiber perpendicular to its signal light propagating direction, when surface integral values of relative refractive index difference with respect to a reference region having an average refractive index $n_0$ are S1 and S2 in the optical cladding and optical core, respectively, the S-mode optical fiber is designed to satisfy a relationship of $0<S1/S2\leq0.3$. As a result of this configuration, it can effectively restrain dispersion slope from increasing due to "tailing" which inevitably occurs during its manufacturing process.

3 Claims, 4 Drawing Sheets

SINGLE-MODE OPTICAL FIBER

BACKGROUND OF THE INVENTION

1. Field of the Invention

The present invention relates to an optical fiber used in the field of optical communications and, in particular, to a single-mode optical fiber having a low dispersion slope.

2. Related Background Art

Conventionally, optical communication systems employing a single-mode optical fiber (hereinafter referred to as S-mode optical fiber) as their transmission line have often utilized light in the wavelength band of 1.3 $\mu$m or 1.55 $\mu$m as their signal light for communications. Recently, in order to reduce transmission loss in the transmission line, the light in the wavelength band of 1.55 $\mu$m has been in use more and more. The S-mode optical fiber employed in such a transmission line for light in the wavelength band of 1.55 $\mu$m (hereinafter referred to as 1.55-$\mu$m S-mode optical fiber) has been designed such that its wavelength dispersion (phenomenon in which pulse wave spreads due to the fact that velocity of propagation of light changes depending on its wavelength) is nullified (namely, to yield a dispersion-shifted fiber whose zero-dispersion wavelength is 1.55 $\mu$m). For example, as such a dispersion-shifted fiber, Japanese Patent Publication No. 3-18161 discloses a dispersion-shifted fiber having a dual-shape-core type refractive index profile. Also, a dispersion-shifted fiber having a segmented-core type refractive index profile is disclosed in "Relation between Macrobending Losses and Cutoff Wavelength in Dispersion-Shifted Segmented-Core Fiber," *Electronics Letter*, Vol. 22, No. 11, p. 574, 1986.

In such a conventional S-mode optical fiber having a dual-shape or segmented-core type refractive index profile, its optical core comprises an inner core occupying a center portion and having the highest average refractive index; and an outer core, disposed around the outer periphery of the inner core, having an average refractive index lower than that of the inner core but higher than that of its surrounding cladding. The inner and outer cores are in close contact with each other in the S-mode optical fiber having a dual-shape type refractive index profile, whereas they are separated from each other in the S-mode optical fiber having a segmented-core type refractive index profile.

Formed around the optical core constituted by the inner and outer cores is a cladding having a refractive index lower than the average refractive index of the outer core.

The cladding, which is a part constituting the outermost layer of the optical fiber, is often made of pure silica from the viewpoint of weather resistance and the like. The inner and outer cores, which ought to have an average refractive index higher than that of the cladding, are usually doped with $GeO_2$ or the like in order to enhance the refractive index. Also, known as an alternative method of adjusting the refractive index is a method in which, for example, the cladding region is doped with fluorine such that the cladding region has a refractive index relatively lower than that of the core region.

SUMMARY OF THE INVENTION

As a result of studies concerning the conventional 1.55-$\mu$m band S-mode optical fibers (dispersion-shifted fibers), the inventors have found the following problems. Namely, in a process of making the optical fiber including a heating step, an additive such as $GeO_2$ which should be added only to the core region inevitably disperses into the cladding region, thereby such additive may mingle into pure silica in the vicinity of the interface between the cladding and core regions. Also, in the case where fluorine is added to the cladding region, the concentration of fluorine may become uneven in the cladding region.

As a result, there may occur so-called "tailing" in which refractive index gradually decreases from the interface between the core and cladding regions toward the outside. This "tailing" may similarly occur either when the cladding region is doped with fluorine or when the cladding region is made of pure silica.

Though such occurrence of "tailing" has not conventionally been taken into consideration when designing refractive index profiles, it actually enhances their dispersion slope. While the zero-dispersion wavelength of the conventional 1.55-$\mu$m S-mode optical fiber is set at the band of 1.55 $\mu$m, when a dispersion slope exists, wavelength dispersion gradually increases as the signal light wavelength deviates from the zero-dispersion wavelength. The greater is the dispersion slope, the greater becomes the wavelength dispersion due to the deviation from the zero-dispersion wavelength. Such dispersion slope severely restricts the amount of deviation, from the zero-dispersion wavelength, of the signal light outputted from its light source, thus becoming an obstacle to designing optical communications systems.

On the other hand, in long-distance transmission, since the zero-dispersion wavelength and the signal light wavelength are separated from each other, it is necessary to lower the dispersion slope or compensate for the dispersion. Nevertheless, in wavelength division multiplex (WDM) transmission in which a plurality of wavelengths are transmitted as being superposed on each other in order to increase transmission speed, propagated is not only signal light having a wavelength close to the zero-dispersion wavelength but also signal light having a wavelength far from the zero-dispersion wavelength. Accordingly, due to such signal light whose wavelength is greatly deviated from the zero-dispersion wavelength, there may occur circumstances under which the dispersion cannot be compensated for in practice when the dispersion slope is enhanced. Also, in order to suppress the distortion in optical pulse (optical signal) caused by nonlinear effects, it is essential in the long-distance transmission to increase mode field diameter (MFD), which is preferably set to 10 $\mu$m or more.

It is thus important to reduce the dispersion slope. Nevertheless, since "tailing" has been generated unintentionally, the degree of "tailing" has not been adjusted notwithstanding that "tailing" can be controlled in the process of making the optical fiber.

In order to overcome the foregoing problems, it is an object of the present invention to provide a single-mode optical fiber having a configuration for effectively restraining the dispersion slope from increasing.

In order to achieve the above-mentioned object, the present invention provides a single-mode optical fiber (S-mode optical fiber) for long-distance transmission, which has an MFD of at least 10 $\mu$m and is mainly composed of silica glass, comprising, at least, an inner core extending along a propagating direction of signal light; an outer core which is provided around the outer periphery of the inner core and constitutes an optical core together with the inner core; an inner cladding which is provided around the outer periphery of the outer core; an outer cladding which is provided around the outer periphery of the inner cladding and constitutes an optical cladding together with the inner cladding.

In the inner core, the average of relative refractive index difference with respect to a reference region having a refractive index of $n_0$ is a first value $\Delta n_2$. In the outer core, the average of relative refractive index difference with respect to the reference region is a second value $\Delta n_1$ which is smaller than the first value $\Delta n_2$, whereas its radius b of the outer periphery is defined by a distance from the center of the inner core along the radial direction of the S-mode optical fiber to a part at which the relative refractive index difference with respect to the reference region becomes $1/15$ of a maximum relative refractive index difference value of the inner core with respect to the reference region. Further, the relative refractive index difference of the inner cladding with respect to the reference region gradually decreases from its interface with the outer core toward the outside, and the average of relative refractive index difference with respect to the reference region is substantially zero in the outer cladding. Here, the reference region is, of a region surrounding at least the inner core, a glass region whose distance from the center of the S-mode optical fiber along a radial direction of the S-mode optical fiber is from d/2 (radius of the inner periphery) to d (radius of the outer periphery).

In general, among the S-mode optical fibers, there are those intentionally provided with a cladding region, which does not directly contribute to propagating signal light. Usually, light is propagated while spreading over the vicinity of the core region (part of the cladding region) as well. Since such spreading light in the radial direction of the fiber (direction perpendicular to the light propagating direction) exponentially decreases, in the outer peripheral portion of the cladding region, there exists an area where light is hardly propagated. Since the cladding region located at such an area is a glass region mainly used for securing a physical strength, it is also known as physical cladding or jacket layer. On the other hand, known as optical cladding is a glass region that is located inside the physical cladding and through which light is propagated. Accordingly, the S-mode optical fiber according to the present invention encompasses not only an optical fiber comprising the outer cladding as its outermost layer, which constitutes an optical cladding together with the inner cladding (wherein the reference region coincides with the outer cladding or a region which is included in the outer cladding and corresponds to at least an outer region of the outer cladding); but also an optical fiber further comprising a jacket layer which is disposed around the outer periphery of the outer cladding and does not contribute to propagating light (wherein the reference region is included in the jacket layer disposed around the outer periphery of the outer cladding or includes the jacket layer and a part of the outer cladding).

In particular, in a cross section of the S-mode optical fiber perpendicular to a signal light propagating direction, when a surface integral value of relative refractive index difference of the inner and outer claddings (optical cladding) with respect to the reference region is S1, and a surface integral value of relative refractive index difference of the inner and outer cores (optical core) with respect to the reference region is S2, the S-mode optical fiber according to the present invention satisfies the following relationship:

0<S1/S2≦0.3.

Here, when the refractive index profiles of the inner and outer cores are substantially axially symmetrical with respect to the center axis of the inner core and when the radius of outer periphery of the outer core is b, the surface integral value S2 is substantially given by the following expression:

$$S2 = \int_0^b (\Delta n(r) \cdot r) dr \qquad (1)$$

wherein r is a radial distance from the center of the inner core; and $\Delta n(r)$ is a relative refractive index difference with respect to the reference region at a part radially separated from the center of the inner core by the distance r.

In particular, the radius of the outer periphery of the outer core is preferably at least 10 $\mu$m but not greater than 20 $\mu$m in order to attain a sufficient MFD.

Also, when the refractive index profiles of the inner and outer claddings are substantially axially symmetrical with respect to the center axis of the inner core and when the radius of inner periphery of the inner cladding (coinciding with the radius of the outer periphery of the outer core) is b, and that the radius of the outer periphery of the outer cladding (coinciding with the radius of the outer periphery of the S-mode optical fiber or the radius of the inner periphery of the jacket layer to be disposed around the outer periphery of the outer cladding) is d, the surface integral value S1 is substantially given by the following expression:

$$S1 = \int_b^d (\Delta n(r) \cdot r) dr \qquad (2)$$

wherein r is a radial distance from the center of the inner core; and $\Delta n(r)$ is a relative refractive index difference with respect to the reference region at a part radially separated from the center of the inner core by the distance r.

In this specification, a relative refractive index difference $\Delta n$ of a part having a refractive index n with respect to a region having a refractive index $n_0$ is defined as follows:

$$\Delta n = (n^2 - n_0^2)/(2n^2). \qquad (3)$$

Also, an average value $n_{AV}$ of refractive index n in a specific region is defined by a value obtained when a surface integral value of refractive index within this specific region is divided by the area of this specific region in a cross section of the S-mode optical fiber perpendicular to the signal light propagating direction; whereas an average value $\Delta n_{AV}$ of relative refractive index difference in a specific region is defined by a value obtained when a surface integral value of relative refractive index difference in this specific region is divided by the area of this specific region in the cross section of the S-mode optical fiber perpendicular to the signal light guiding direction.

Accordingly, in the case where a refractive index profile is axially symmetrical, in a region where radial distance from the center is r, inner radius is A, and outer radius is B, the average value $n_{AV}$ of refractive index n(r) and average value $\Delta n_{AV}$ of relative refractive index difference $\Delta n(r)$ are respectively as follows:

$$n_{AV} = \left( \int_A^B (n(r) \cdot 2\pi r) dr \right) \bigg/ (\pi B^2 - \pi A^2) \qquad (4)$$

$$= \left( 2 \int_A^B (n(r) \cdot 2\pi r) dr \right) \bigg/ (B^2 - A^2)$$

-continued and $$\Delta n_{AV} = \left( \int_A^B (\Delta n(r) \cdot 2\pi r) \, dr \right) \Big/ (\pi B^2 - \pi A^2) \qquad (5)$$
$$= \left( 2 \int_A^B (\Delta n(r) \cdot 2\pi r) \, dr \right) \Big/ (B^2 - A^2).$$

In the S-mode optical fiber according to the present invention, while the outer cladding having an average refractive index $n_0$ is used as a reference region, in a cross section of the S-mode optical fiber perpendicular to the light guiding direction, the degree of "tailing" is evaluated according to the value of ratio (S1/S2) between the surface integral value S1 of relative refractive index difference in the optical cladding and the surface integral value S2 of relative refractive index difference in the optical core; and the S-mode optical fiber is designed such that the value (S1/S2) is set to the following range:

$0 < S1/S2 \leq 0.3$.

As a result of studies, the inventors have found that the dispersion slope increases as the value (S1/S2) is greater; and that, commonly in combinations of various values of MFD with various values of zero-dispersion wavelength, as compared with the case where there is substantially no "tailing," the increase in dispersion slope is not greater than 0.001 ps/nm$^2$/km when the value (S1/S2) is not greater than 0.3 and thus is negligible, though the dispersion slope drastically increases when the value (S1/S2) exceeds 0.3.

Consequently, in the S-mode optical fiber according to the present invention, when the radius b of outer periphery of the outer core (coinciding with the radius of inner periphery of the inner cladding) is at least 10 μm but not greater than 20 μm, and the value (S1/S2) is not greater than 0.3, the dispersion slope can be suppressed to 0.08 ps/nm$^2$/km or less.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the following, embodiments of a single-mode optical fiber (S-mode optical fiber) according to the present invention will be explained with reference to FIGS. 1 to 6. Here, in the explanation of the drawings, elements identical to each other will be referred to with numerals or letters identical to each other without their overlapping descriptions being repeated.

Figure 1:
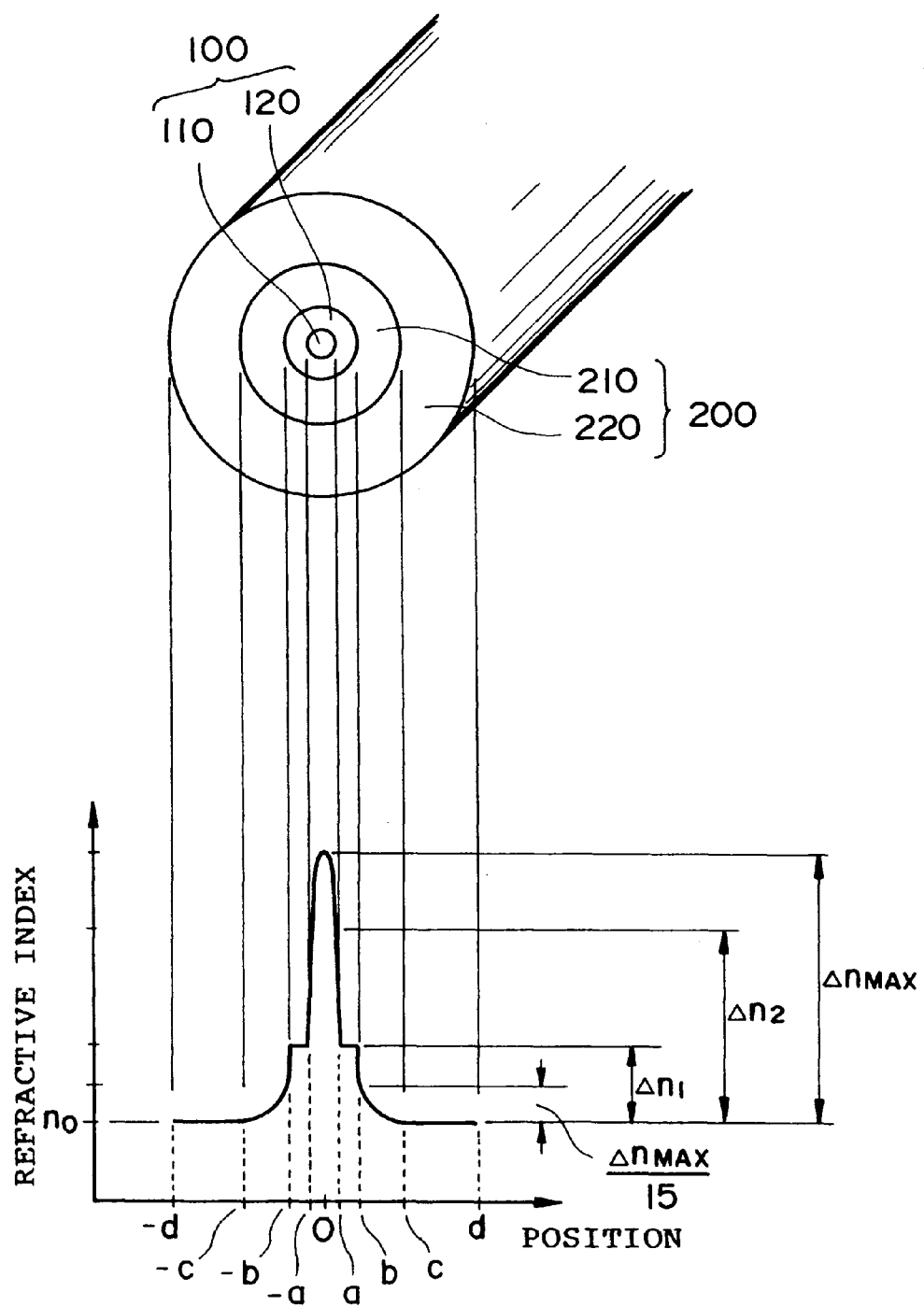
FIG. 1 is a view showing a cross-sectional configuration of a single-mode optical fiber according to the present invention and its refractive index profile.

FIG. 1 is a view showing a cross-sectional configuration of the S-mode optical fiber according to the present invention and its refractive index profile. As shown in FIG. 1, this S-mode optical fiber comprises, at least, an inner core 110; an outer core 120 which is disposed around the outer periphery of the inner core 110 and constitutes an optical core 100 together with the inner core 110; an inner cladding 210 which is disposed around the outer periphery of the outer core 120; and an outer cladding 220 which is disposed around the outer periphery of the inner cladding 210 and constitutes an optical cladding 200 together with the inner cladding 210.

In the inner core 110, the average of relative refractive index difference with respect to a reference region having a refractive index $n_0$ is a value $\Delta n_2$, whereas the radius of its outer periphery is defined by a distance along a radial direction of the optical fiber from the center of the inner core 110 to a part at which the relative refractive index difference becomes ⅓ of a maximum relative refractive index difference value $\Delta n_{max}$ with respect to the reference region. In the outer core 120, the average relative refractive index difference with respect to the reference region is a value $\Delta n_1$ ($<\Delta n_2$), whereas the radius of the outer periphery of the outer core 120 is defined by a distance along the radial direction of the optical fiber from the center of the inner core 110 to a part at which the relative refractive index difference becomes 1/15 of the maximum relative refractive index difference value $\Delta n_{max}$. In addition, the relative refractive index difference of the inner cladding 210 with respect to the reference region gradually decreases from its interface with the outer core 120 toward the outside, and the average of relative refractive index difference of the outer cladding 220 with respect to the reference region is substantially zero.

The reference region is, of a region surrounding at least the inner core, a glass region in which the distance from the center of the S-mode optical fiber along a radial direction is from d/2 (radius of the inner periphery) to d (radius of outer periphery). Though the S-mode optical fiber may be configured such that a jacket layer (physical cladding) which does not directly contribute to propagating light is disposed around the outer periphery of the optical cladding (outer periphery of the outer cladding 220 in particular), the outer cladding 220 substantially corresponds to the reference region in this embodiment.

In this embodiment, the refractive index profiles in the inner core 110, outer core 120, inner cladding 210, and outer cladding 220 are substantially axially symmetrical with respect to the center axis of the inner core 110. Accordingly, the cross sections of the inner core 110, outer core 120, inner cladding 210, and outer cladding 220 are substantially formed like circles having radii of a, b, c, and d (=125 μm/2), respectively.

In addition, in this S-mode optical fiber, in a cross section of the S-mode optical fiber perpendicular to the signal light propagating direction, the value (S1/S2) given by the surface integral value S2 defined by expression (1) and the surface integral value S1 defined by expression (2) is set to the following range:

$0 < S1/S2 \leq 0.3$.

Figure 6:
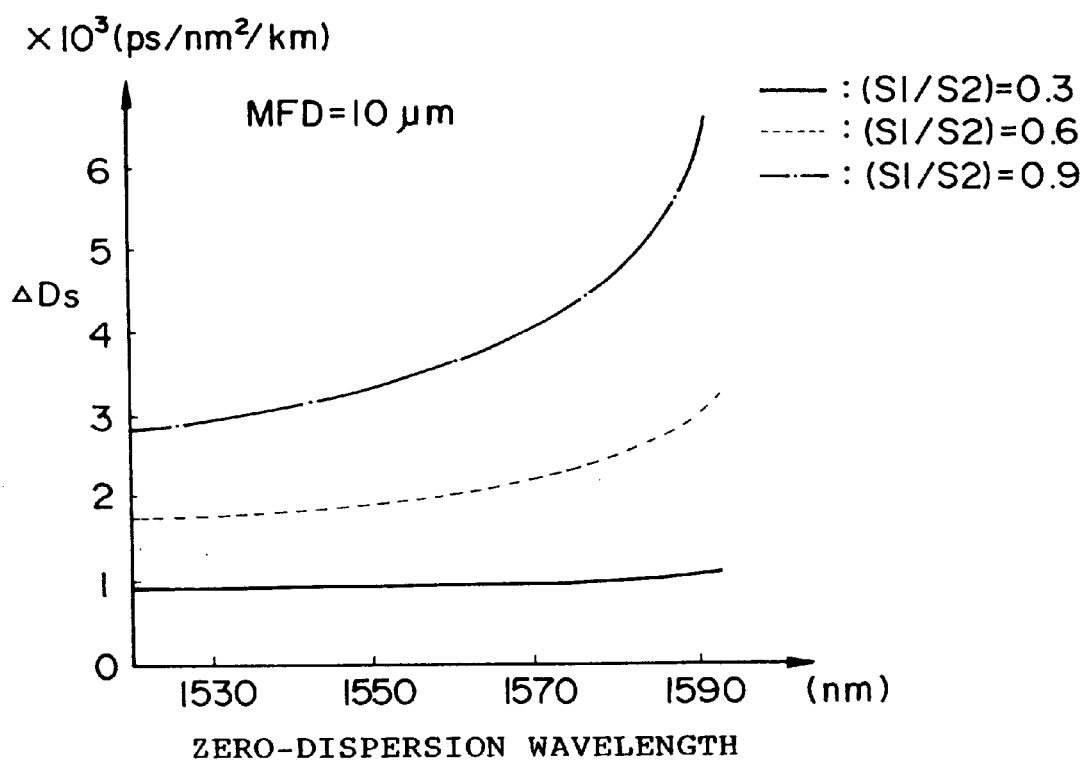
FIG. 6 is a graph showing dependency of $\Delta D_s$ (dispersion slope difference) upon zero-dispersion wavelength when (S1/S2)=0.3, 0.6, and 0.9 in the case where MFD (mode field diameter)=10 μm.

FIGS. 2 to 5 are graphs showing, at their respective zero-dispersion wavelengths, dependency, upon MFD, of value (S1/S2) of dispersion slope difference $\Delta D_s$(S1/S2) which is defined by:

$$\Delta D_s(S1/S2) = D_s(S1/S2) - D_s(0)$$

wherein $D_s(S1/S2)$ is dispersion slope, and $D_s(0)$ refers to the dispersion slope when "tailing" substantially does not exist, i.e., when the value S1 is zero. FIG. 6 is a graph showing dependency of dispersion slope difference $\Delta D_s(S1/S2)$ upon zero-dispersion wavelength when $(S1/S2)=0.3$, 0.6, and 0.9 in the case where MFD=10 µm.

Figure 2:
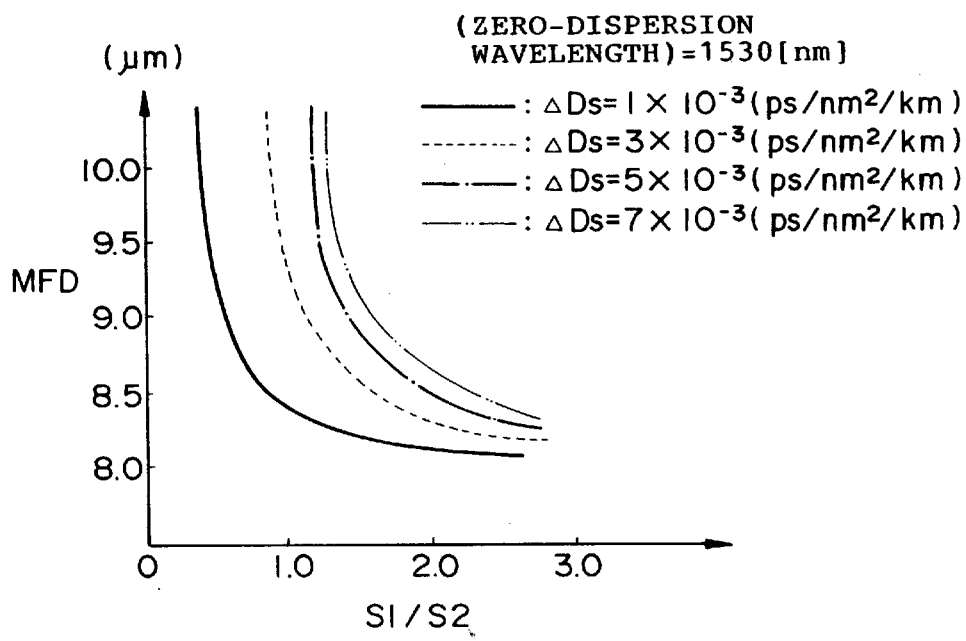
FIGS. 2 to 5 are graphs showing dependency of MFD (mode field diameter) upon value (S1/S2) of dispersion slope difference $\Delta D_s$(S1/S2), respectively showing relationships between the value (S1/S2) and MFD at zero-dispersion wavelengths of 1,530 nm, 1,550 nm, 1,570 nm, and 1,590 nm.
Figure 3:
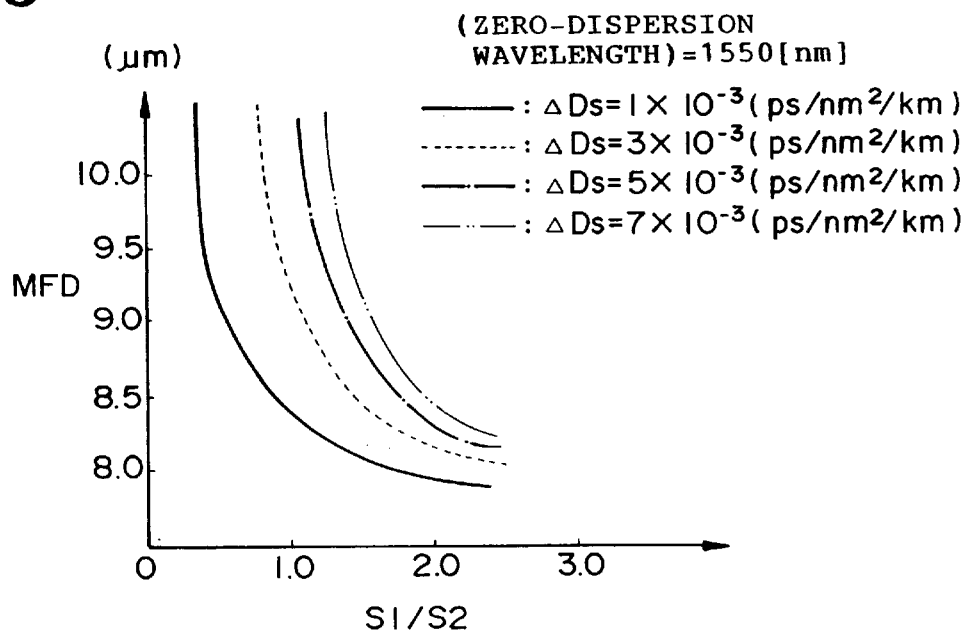
Figure 4:
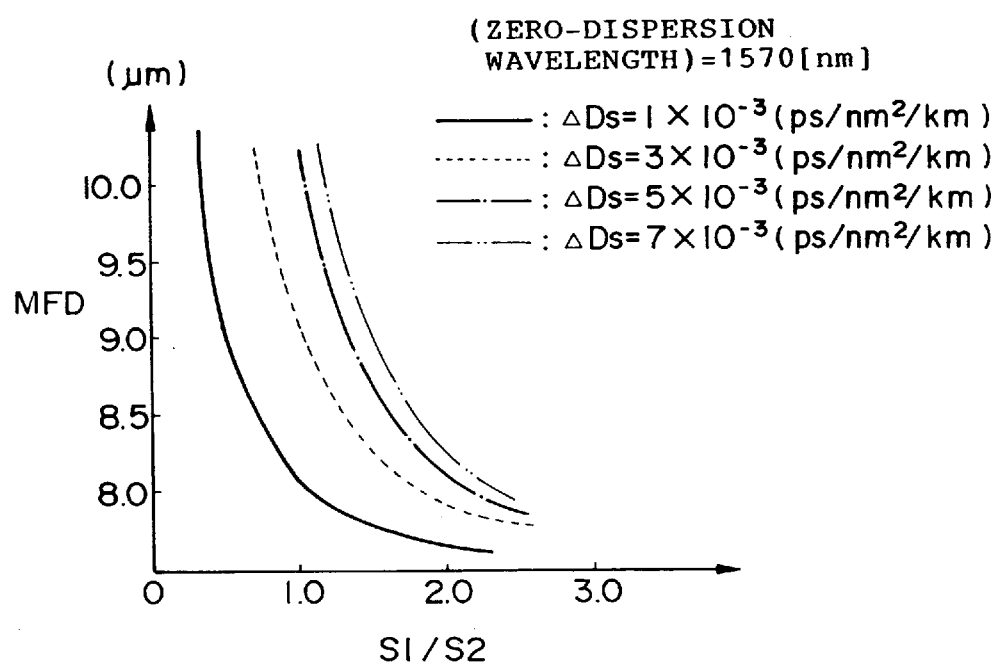
Figure 5:
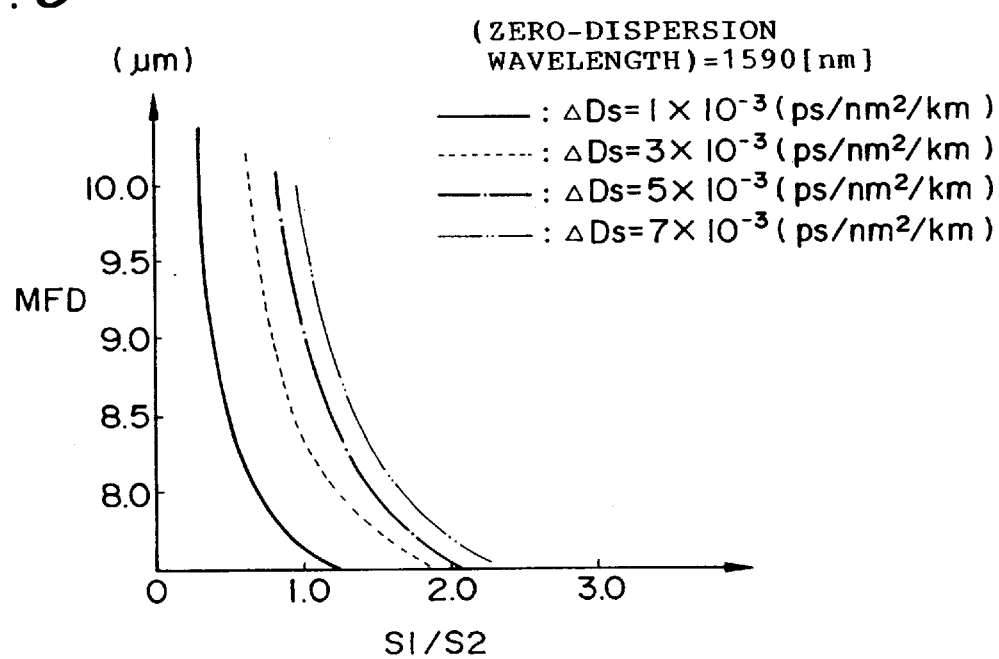

Specifically, FIG. 2 shows relationships between the value (S1/S2) and MFD respectively obtained when $\Delta D_s(S1/S2) = 1\times 10^{-3}$ ps/nm²/km, $3\times 10^{-3}$ ps/nm²/km, $5\times 10^{-3}$ ps/nm²/km, and $7\times 10^{-3}$ ps/nm²/km at a zero-dispersion wavelength of 1,530 nm under a structural condition where the average value $\Delta n_1$ of relative refractive index of the outer core 120 with respect to the reference region (refractive index: $n_0$) is about 0.09%, and the value a/b of ratio between the outer diameter 2a of the inner core 110 and the outer diameter 2b of the outer core 120 is about 0.25. FIG. 3 shows, under the structural condition identical to that of FIG. 2, the respective relationships between the value (S1/S2) and MFD obtained when $\Delta D_s(S1/S2)=1\times 10^{-3}$ ps/nm²/km, $3\times 10^{-3}$ ps/nm²/km, $5\times 10^{-3}$ ps/nm²/km, and $7\times 10^{-3}$ ps/nm²/km at a zero-dispersion wavelength of 1,550 nm. FIGS. 4 and 5 are under the same condition as FIG. 2 except that their zero-dispersion wavelengths are 1,570 nm and 1,590 nm, respectively. While the outer diameter 2a of the inner core 110, outer diameter 2b of the outer core 120, and average value $\Delta n_2$ of relative refractive index difference of the inner core 110 with respect to the reference region (refractive index $n_0$) are appropriately selected so that each of the above-mentioned combinations of MFD and zero-dispersion wavelength values is attained, the radius b of outer periphery of the outer core 120 is preferably at least 10 µm but not greater than 20 µm in order to attain a sufficient MFD, and so forth.

From FIGS. 2 to 5, it can be seen that the smaller the value (S1/S2) is, the smaller becomes the increase in dispersion slope from the case where "tailing" substantially does not exist, i.e., in dispersion slope difference $\Delta D_s$. In particular, since the dispersion slope difference $\Delta D_s$ disadvantageously increases when the MFD becomes larger, it is necessary for the value (S1/S2) to be a predetermined level or less.

Also, FIG. 6 indicates that when the value (S1/S2) is equal to or smaller than 0.3 in the case where MFD is not smaller than 10 µm, the dispersion slope difference $\Delta D_s$ does not increase even when the zero-dispersion wavelength changes, thus yielding an advantageous situation.

Accordingly, in the S-mode optical fiber according to the present invention, as the radius b of the outer periphery of the outer core 120 is at least 10 µm but not greater than 20 µm, while the value (S1/S2) is not greater than 0.3, the dispersion slope can be suppressed to 0.08 ps/nm²/km or less, thus allowing light to be favorably transmitted.

The implementation of the present invention can be modified in various manners without being restricted to the above-mentioned embodiment. For example, though the above-mentioned embodiment relates to an S-mode optical fiber having a dual-shape-core type refractive index profile, similar effects can also be obtained when the present invention is constituted by an S-mode optical fiber having a segmented-core type refractive index profile.

As explained in the foregoing, in the S-mode optical fiber according to the present invention, an optical core is constituted by inner and outer cores, while an optical cladding is constituted by an inner cladding in which "tailing" occurs and an outer cladding; and this S-mode optical fiber is designed such that, in a cross section of the S-mode optical fiber perpendicular to its signal light propagating direction, when surface integral values of relative refractive index difference with respect to a reference region (e.g., outer cladding) are S1 and S2 in the optical cladding and optical core, respectively, the following relationship:

$$0 < S1/S2 < 0.3$$

is satisfied.

Consequently, it can effectively restrain dispersion slope from increasing due to "tailing" which inevitably occurs during its manufacturing process.

From the invention thus described, it will be obvious that the implementation of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A single-mode optical fiber, mainly composed of silica glass, having a mode field diameter not smaller than 10 µm and a radius d; said single-mode optical fiber comprising:

an inner core whose average of relative refractive index difference with respect to a reference region is a first value of a region surrounding at least said inner core, a glass region whose distance from a center of said single-mode optical fiber along a radial direction of said single-mode optical fiber is from d/2 to d;

an outer core disposed around the outer periphery of said inner core, said outer core constituting an optical core together with said inner core, an average of relative refractive index difference of said outer core with respect to said reference region being a second value smaller than said first value, a radius of the outer periphery of said outer core being defined by a distance from a center of said inner core along the radial direction of said single-mode optical fiber to the part at which the relative refractive index difference with respect to said reference region becomes $1/15$ of a maximum relative refractive index difference value of said inner core with respect to said reference region;

an inner cladding provided around the outer periphery of said outer cladding, said inner cladding having a relative refractive index difference with respect to said reference region gradually decreasing from an interface thereof with said outer core along the radial direction of said single-mode optical fiber;

an outer cladding provided around the outer periphery of said inner cladding, said outer cladding constituting an optical cladding together with said inner cladding, an average of relative refractive index difference of said outer cladding with respect to said reference region being substantially zero;

wherein, in a cross section of said single-mode optical fiber perpendicular to a signal light propagating direction, when surface integral values of relative refractive index difference with respect to said reference region are S1 and S2 in said optical cladding and optical core, respectively, said single-mode optical fiber satisfies the following relationship:

$$0 < S1/S2 \leq 0.3.$$

2. The single-mode optical fiber according to claim 1, wherein said single-mode optical fiber has a dispersion slope of 0.08 ps/nm²/km or less.

3. The single-mode optical fiber according to claim 1, wherein said outer core has a radius of outer periphery of at least 10 µm but not greater than 20 µm.

* * * * *